United States Patent [11] 3,626,372

[72] Inventor Kenneth A. Chayt
Washington, D.C.
[21] Appl. No. 26,550
[22] Filed Apr. 8, 1970
[45] Patented Dec. 7, 1971
[73] Assignee The United States of America as represented by the Secretary of the Navy

[54] DIGITAL INFORMATION TRANSMISSION SYSTEM
10 Claims, 3 Drawing Figs.

[52] U.S. Cl. .................................................... 340/168 R, 340/146.1, 178/69.5
[51] Int. Cl. .................................................... G08b 29/00, H04l 7/00
[50] Field of Search ........................................ 340/167, 168, 168 SR, 147, 146.1; 178/69.5

[56] References Cited
UNITED STATES PATENTS

| | | | |
|---|---|---|---|
| 3,426,323 | 2/1969 | Shimabukuro ............... | 340/146.1 |
| 3,523,279 | 8/1970 | Briley et al.................... | 340/146.1 |

*Primary Examiner*—Donald J. Yusko
*Attorneys*—R. S. Sciascia, Arthur L. Branning and James G. Murray

ABSTRACT: Transmission system whereby digital information in a shift register is serially transmitted into a remotely located shift register. The described preferred embodiment utilizes a hardwire link between a submarine and a towed buoy to control the operational mode of the buoy electronics and includes means which automatically reset the system in the event of a malfunction.

50

INVENTOR
KENNETH A. CHAYT

BY James D Murray ATTORNEY

INVENTOR
KENNETH A. CHAYT

BY James G. Murray ATTORNEY

INVENTOR
KENNETH A. CHAYT

BY
James G. Murray ATTORNEY

DIGITAL INFORMATION TRANSMISSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although the reader will recognize that the broad aspects of the present invention encompass utility in many environments and with many different types of transmission links between a control center and a remote station, for purposes of narrative convenience the invention will be described as being used by an operator in a submarine for the purpose of controlling, through a cable, the electronic mode of a towed buoy.

Because of the demands of security and of varied missions, it is obviously highly desirable for a submarine to be able to receive and transmit messages by many different radio links. For this purpose there has recently been developed a transceiver package for use in an antenna buoy which is sent to the surface by a submerged submarine. This transceiver is capable of transmitting and receiving on several channels in the HF and UHF bands and of receiving several segments of the VLF band.

Since there are only a few conductors available in the cable to the buoy, the system must be designed to use each of these lines as efficiently as possible. Prior to the present invention, the operator on the submarine controlled the general state of the buoy transceiver by means of a motor driven switch and latching relay system that was set by voltage combinations and required the use of four of the cable conductors. In addition to the highly undesirable use of four conductors, the prior system was not completely satisfactory because of the physical size of the rotary switch and other control apparatus, because the transceiver had to be muted during the setting operation and because the operator received no indication when there was a failure of a latching relay.

SUMMARY OF THE INVENTION

All of the advantages of the prior rotary switch are included in the invention which will be disclosed herein and which also includes the advantageous features that only one cable conductor is required from the submarine to the buoy for the purpose of controlling the operational mode of the buoy electronics, that the transceiver continues to operate during the transmission of setting information from the submarine to the buoy and that the buoy portion of the system will sense a malfunction and provide the operator on the submarine with a signal indicating the occurrence of such a malfunction.

To attain these advantageous features, the invention is disclosed as utilizing a clock driven shift register on the submarine which is loaded in parallel with digital data that is then transmitted serially over a single conductor to the buoy and is there loaded into a shift register which controls latching circuitry that in turn controls the operational mode of the buoy electronics. The buoy portion of the system includes a gating and flip-flop circuit which senses power or parity check failure and thereupon transmits a signal back to the submarine which automatically resets the buoys controls.

OBJECTS

It is therefore an object of this invention to provide an improved digital information transmission system.

Another object is the provision of an improved digital information transmission system wherein information is transmitted serially through a single-transmission link.

Still another object of the present invention is to provide an improved digital information transmission system wherein digital information stored in a first shift register is serially transmitted through a single-transmission link into a second shift register.

A still further object is to provide a system whereby an operator on a submarine can control through a single conductor the operational mode of the electronic system in a buoy.

DESCRIPTION OF THE DRAWINGS

Other objects and advantages of the invention will hereinafter become more fully apparent from the following description of a preferred embodiment of the invention as illustrated in the accompanying drawings in which.

DESCRIPTION OF THE PREFERRED EMBODIMENT

Figure 1:
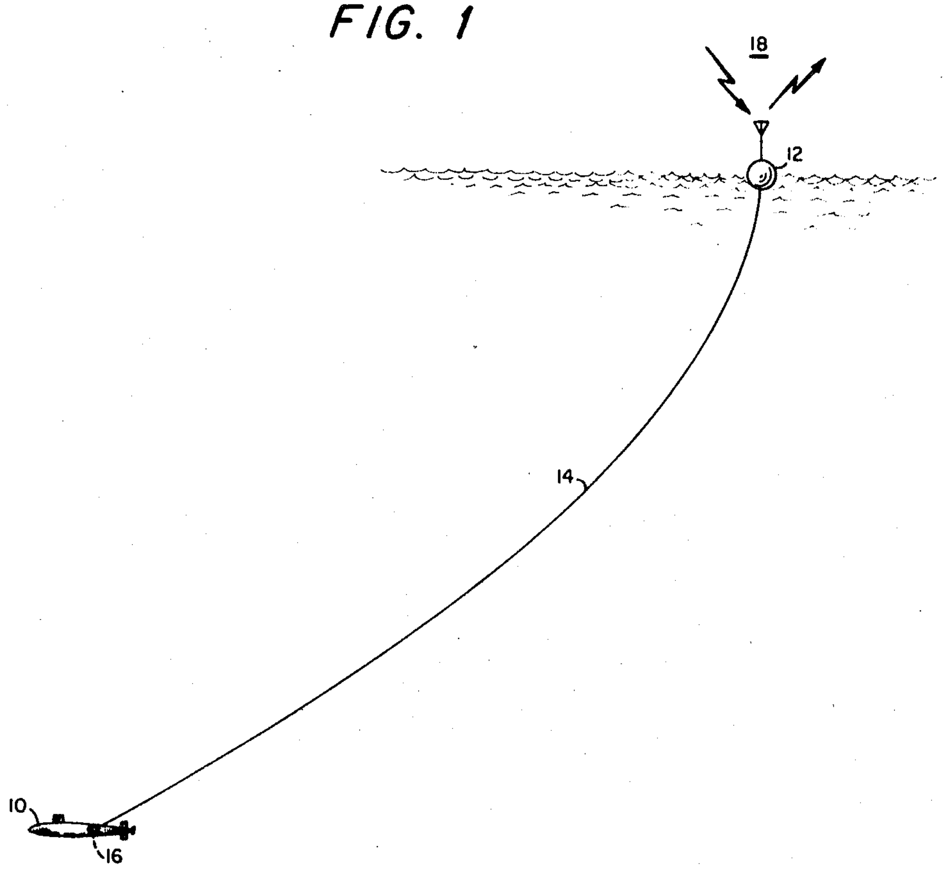
FIG. 1 shows the invention being used in the environment of a submarine and a towed buoy.

Referring now to the drawings, wherein like reference numerals designate like or corresponding parts throughout the several views, there is shown in FIG. 1 (which illustrates a preferred embodiment) a submerged submarine 10 which is towing a surfaced buoy 12 that is connected to the submarine by the cable 14 which includes a limited number of electrical conductors. An electronic box 16 on the submarine and the electromagnetic wave pattern 18 at the buoy are symbolically representative of the many and varied forms of HF, UHF and VLF, etc., communications which the commander of the submarine may use to transmit and receive messages through the transceiver system on the buoy 12 and which, the reader can readily appreciate, are often intimately related to the function of the submarine and to the security of both the submarine and the nation. In view of this, continual operation, reliability and an awareness of any malfunction are all of vital importance in the functioning of the electronic communications system of the submarine and in the operational mode control system of the buoy transceiver, this latter system being the subject matter of the preferred embodiment of the invention as subsequentially disclosed. It is also evident that since the number of conductors in the cable 14 is limited, the control of the operational mode of the buoy transceiver is desirably exercised through a single cable conductor.

Figure 2:
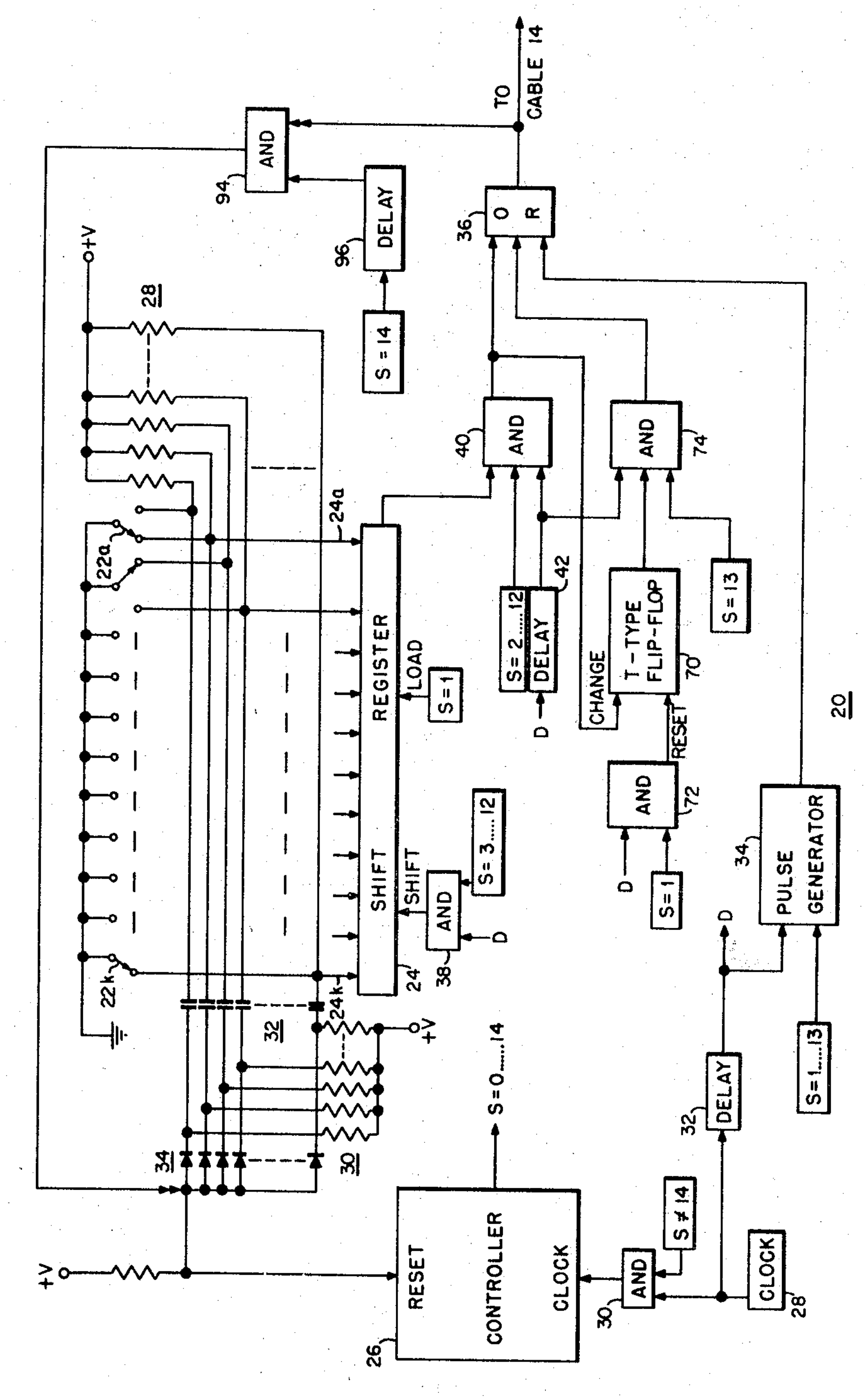
FIG. 2 is a block diagram of the portion of the invention used on the submarine.

FIG. 2 illustrates that portion 20 of the preferred embodiment of the invention which is located on board the submarine and with which the operator fixes the operational mode of the electronic system of the buoy, i.e., sets switches and relays on the buoy 12 which determine what channels are used to transmit, which bands are scanned for receiving messages, what electronic countermeasures are employed, etc. To accomplish this selection of bands, frequencies, countermeasures, reception, transmission, etc. the operator positions the switches ***22a* ... *k* which are illustrated as being 11 but could obviously be either more or less in number. Depending upon the positions of the switches *22a* ... *k* either a high (+V) or low (ground) potential will be applied to the inputs *24a* ... *k* of the shift register 24 and these signals define the operational mode of the buoy transceiver desired by the operator. A change in position in any of the switches *22a* ... *k* causes a negative pulse to be sent to the Reset terminal of controller 26, this negative pulse occurring because of obvious cooperative functionings in the circuitry which includes the positive potential source +V, resistors 28 and 30, capacitors 32 and semiconductors 34**.

Controller 26 is connected to be energized by a clock, i.e. pulse generator 28, through a gate 30 which is illustrated as being an AND-type. However, it will be apparent to persons skilled in designing electronic circuitry that inverting (NAND) gates would also be used for both the gate 30 and the many other AND gates illustrated. After being reset, the controller 26 is energized by clock 28 to produce 14 individual signals which are applied to various locations throughout the invention and which are, for convenience, illustrated and described in the form S=1, S=3 ... 9, etc. For example, as shown, the gate 30 receives enabling signals for all but the controller signal 14 (S≠14). The absence of an enabling signal S=14 at gate 30 stalls the controller 26 until it is reset by a reset signal such as occurs for a change of position of one of the switches 22a ... k. The clock 28 is also connected to a delay 32 that in turn applies signals D at various locations throughout the invention as illustrated. Signal D is only slightly delayed from the clock pulse, the delay being for the purpose of avoiding switching and other transients.

Delay device 32 is connected to pulse generator 34 which is energized by signals S=1 ... 13 to produce distinctive synchronizing pulses which are readily distinguishable (by a detector on buoy 12) from other signals transmitted by the submarine apparatus 20 via the cable 14. The pulse generator 34 is connected to cable 14 through an OR-gate 36, which could, of course, also be an inverting type of gate. As will be subsequently more apparent, the synchronizing pulses from generator 34 chronologically coordinate the operation of the transceiver control circuitry on the buoy 12 with the clock 28 on the submarine.

Shift register 24 is energized by S=1 to load in parallel the binary signals present on the inputs 24a ... k, as determined by the positions of the switches 22a ... k. Signals S=2 and D cause the signal stored in the output stage of shift register 24 and relating to the position of switch 22a to be transmitted to buoy 12 through the AND-gate 40, the OR-gate 36 and cable 14. In a readily apparent manner, subsequent signals s=3 ... 12 and D acting through AND-gate 38 cause the signals stored in the shift register 24 and relating to the positions of switches 22b ... k to be sequentially shifted into the shift register output stage and transmitted through gates 40 and 36 and cable 14. Enabling of the 40 is delayed by device 42 for a period of time sufficient to avoid the synchronizing pulses from generator 34.

Figure 3:
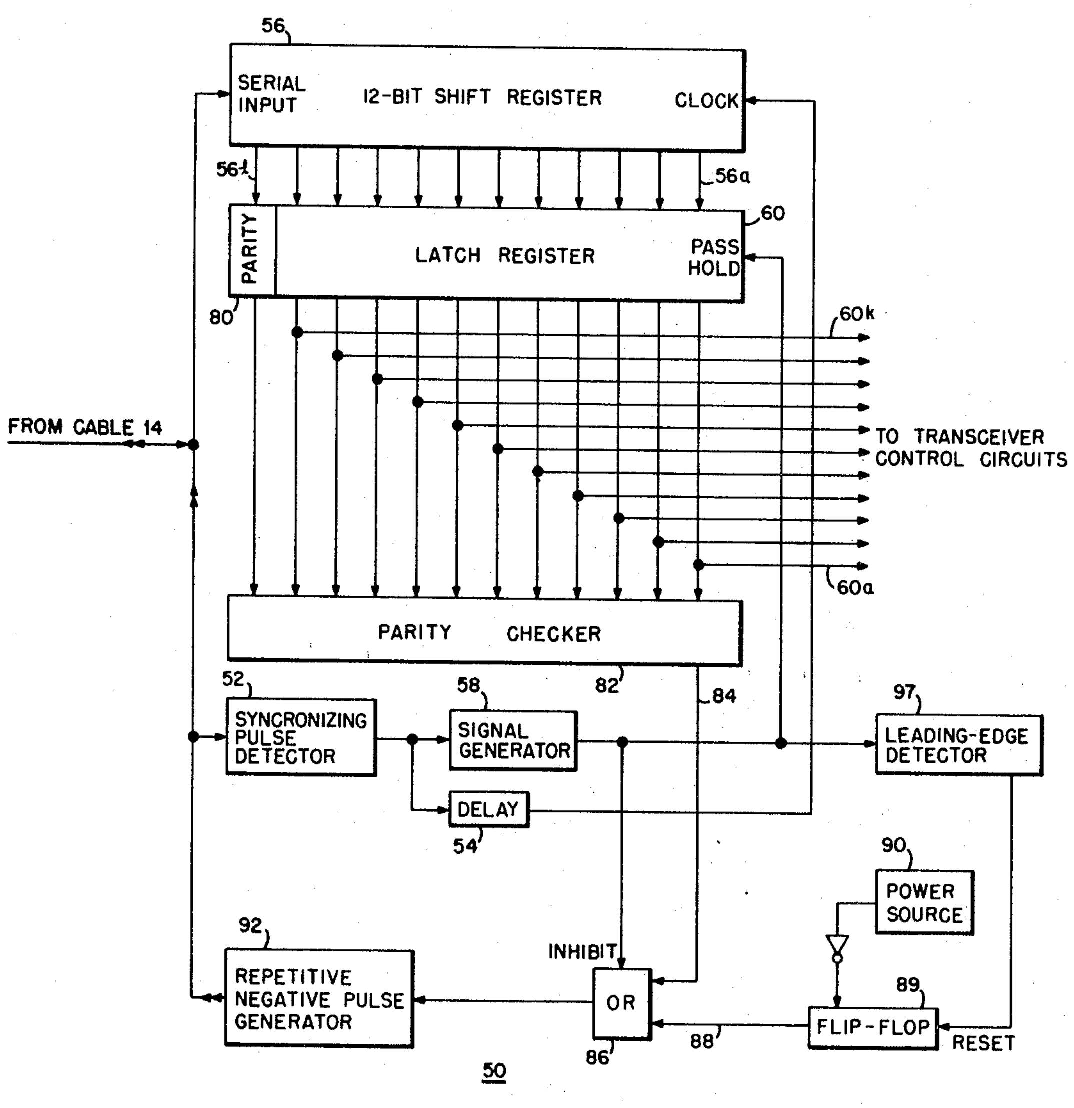
FIG. 3 is a block diagram of the portion of the invention used on the buoy.

The portion 50 of the preferred embodiment of the invention that is in the buoy 12 is illustrated in FIG. 3. As previously described, the cable 14 conductor transmits 13 synchronizing pulses from generator 34, the last 12 of which are followed (by the delay period caused by the device 42) with the eleven binary signals representative of the setting of control switches 22a ... k and by a parity check bit yet to be described. These 13 synchronizing pulses are of a nature which is readily distinguishable from the 12 binary signals and are detected by pulse detector 52, the output of which is connected through delay 54 to the 12-bit shift register 56 and causes that shift register to shift and then sample and store the incoming binary signals. The delay by device 54 is sufficient to allow the binary signal to arrive for the sampling and storing process. The output of the synchronizing pulse detector 52 is also connected to signal generator 58 which is of the type that will produce a signal as long as pulse detector 52 detects synchronizing pulses at approximately the frequency of clock 28. This signal from generator 58 is applied to latch register 60 and locks that register to retain the binary signals which are then present and which are applied over output leads 60a ... k to the buoy transceiver controls. As shown, the latch register 60 is connected to the output leads 56a ... l of the 12-bit shift register 56 and in the absence of a locking signal from generator 58 passes whatever signals appear on these output leads.

An important advantageous feature of the preferred embodiment of the invention, described and illustrated, will now be apparent. Because of the functioning of the latch register 60 and the cooperative locking thereof by the signal generator 58, the operation of the buoy transceiver is not interrupted during the loading of shift register 56. When signal generator 58 turns off (i.e. when detector 52 no longer detects synchronizing pulses) all changes in the operational mode of the buoy transceiver occur simultaneously.

Together with a further description of FIGS. 2 and 3, another advantageous feature of the preferred embodiment will now be disclosed, i.e. the feature whereby the buoy controls are reset and the operator on the submarine 10 is made aware of a power or parity check failure in the buoy 12. The T-type flip-flop 70 (FIG. 2) is connected to be reset (typically low) at the beginning of the controller cycle by signals S=1 and D acting through the AND-gate 72. Each bit signal transmitted through AND-gate 40 is connected to the Change input of flip-flop 70 and changes the output of this flip-flop whenever a high bit is transmitted. Hence, the output of flip-flop 70, upon the completion of the readout of shift register 24, is high if an odd number of high bits are transmitted and low for an even number of such bits. The final condition of flip-flop 70 is transmitted through gates 74 and 36 by enabling signals from delay device 42 and S=13. Since the final condition of flip-flop 70 is the last bit transmitted during the control cycle, it becomes the bit transmitted through lead 56–1 (FIG. 3) and the parity portion 80 of latch register 60 (when generator 58 turns off) to the parity checker 82 which is also connected to receive the other output signals of latch register 60.

Parity checker 82 can take any one of many well known forms, although it is contemplated that, in addition to obvious comparison gating circuits, the checker will, in part, be similar to the already described flip-flop 70, and will function to produce an output signal on lead 84 if the polarity on lead 56–1 does not coincide with the evaluation by the parity checker of the signal on leads 60a ... k according to the rule previously set forth, i.e. high if an odd number of high bits are on leads 60a ... k and low for an even number of such bits.

Lead 84 is connected to OR-gate 86, which is inhibited by the signal from generator 58. The OR-gate 86 is also connected to receive a signal through the lead 88 and flip-flop 89 in the event of OR-gate failure of the power source 90. In turn, OR-gate 86 is connected to energize the repetitive negative pulse generator 92 (in the absence of an inhibit signal from generator 58) with any signal appearing on leads 84 or 88. Generator 92 produces negative pulses which follow the path illustrated with double arrowheads back through cable 14 and gate 94 (which is enabled by S=14 as suitable delayed by device 96) to reset and thereby initiate the cycling of controller 26. The frequency of generator 92 is low compared to that of clock 28 so that no interference will occur between the generator signals and the cycling processes.

As shown in FIG. 3, a failure of source 90 sets flip-flop 89 which is connected to be reset by a leading-edge detector 97 that produces a signal at the beginning of the signal produced by generator 58. Thus, a temporary failure of source 90 will not go undetected, even though it occurs during the cycling sequences when generator 58 is producing a signal, since any failure of source 90 requires the start of a separate cycle to reset flip-flop 89.

The operation of the preferred embodiment of the invention described and illustrated is by now, no doubt, apparent. In the quiescent state, controller 26 is stalled at S=14 with gate 94 enabled. Normally, the operator changing one or more positions of the switches 22a ... k resets and starts the cycling of controller 26, although this may also occur (and thus alert the operator) because of the failure of power source 90. At S=1 the shift register 24 is loaded in parallel and synchronizing pulse generator 34 energized. During the operation of generator 34 the latch register 60 is locked by detector 52 and signal generator 58 to hold its present values. In the cycling steps S=2 ... 12 the recently loaded signals in shift register 24 are serially unloaded through gates 40 and 36, cable 14 and serially loaded into shift register 56. The parity bit output from flip-flop 70 is transmitted at S=13 and generator 34 is deenergized. This results in the deenergization of generator 58 and the accompanying unlocking of latch register 60 to allow the desired changes in the operational mode of the buoy transceiver and the operation of the parity checker 82 and, if warranted, the recycling of controller 26 by the repetitive negative pulse generator 92 which acts through cable 14 and the gate 94 which is enabled at S= 14.

Persons desiring more information concerning the preferred embodiment of the invention just described, such as circuit details, are directed to Naval Research Laboratory Memorandum Report 1967 which was made available to the public on May 29, 1969 under Accession No. AD–687383 by the Clearing House for Federal Scientific and Technical Information, Springfield, Va. 22151.

There has been disclosed an improved digital information transmission system wherein digital information stored in a first shift register is serially transmitted through a single transmission link into a second shift register and, in the preferred embodiment described, wherein an operator on a submarine can control the operational mode of the electronic system in a towed buoy and can be alerted to either a power or parity check failure.

It should be understood, of course, that the foregoing disclosure relates to only a preferred embodiment of the invention and that numerous modifications or alterations may be made therein without departing from the spirit and the scope of the invention is set forth in the appended claims.

I claim:

1. A remote control system whereby an operator at a first location can control the mode of operation of apparatus at a second location, comprising:

an $n$-bit shift register located at said first location;

a plurality of switches individually connected to said $n$-bit shift register, the setting of said switches being controllable by said operator to provide a plurality of digital signals representative of the desired mode of operation of said apparatus at said second location;

loading means included in said $n$-bit shift register for simultaneously loading said $n$-bit shift register with digital information relating to all of said plurality of digital signals;

an $n+1$-bit shift register located at said second location;

a single conductor electrically joining said first and second locations for transferring said plurality of digital signals;

driving means connected to said $n+1$-bit shift register for driving said $n+1$-bit shift register at a rate delayed in time from said $n$-bit shift register;

transfer means including said single conductor and functioning to transfer said digital information from said $n$-bit shift register into said $n+1$-bit shift register;

connecting means connecting said $n+1$-bit shift register to the mode controls of said apparatus;

a power source located at said second location and checking means connected to said transfer means, to said power source and to said connecting means for providing a signal if the information transferred into $n+1$-bit shift register does not agree with the information transferred from said $n$-bit shift register or if there is a failure in said power source.

2. The remote control system of claim 5 and further including:

a clock which produces pulses at a stable frequency;

controller means connected to said clock and to said $n$-bit shift register and to said transfer means for sequentially providing a plurality of signals which control, according to a predetermined sequence, the operation of said $n$-bit shift register and said transfer means.

3. The remote control system of claim 7 and further including pulse generator means which are connected to said clock and, through said single conductor, to said $n+1$-bit shift register and which functions to produce pulses which are detectably different from said transferred digital information and which control the operation of said $n+1$-bit shift register.

4. The remote control system of claim 8 wherein said checking means includes:

flip-flop means connected to said transfer means which assumes one to two digital conditions as determined according to a predetermined criteria from said digital information transmitted from said $n$-bit shift register; said digital condition being transmitted by said transfer means into said $n+1$-bit shift register upon the completion of the transfer of said digital information from said $n$-bit shift register and parity checking means connected to said connecting means and functioning to produce said signal provided by said checking means if said transmitted condition of said flip-flop means does not agree with said digital information transferred into said $n+1$-bit shift register.

5. The remote control system of claim 9 wherein said connecting means includes latching means controlled by said pulse generator means which functions to inhibit a change in the mode of operation of said apparatus during the transfer of said digital information into said $n+1$-bit shift register.

6. The remote control system of claim 10 wherein said first location is inside a submarine and said second location is a buoy that is joined to said submarine by a cable which includes said single conductor.

7. A digital information transmission system comprising:

a first shift register;

parallel loading means connected to said first shift register for simultaneously entering a plurality of digital information into said first shift register;

synchronization means at an inboard station for intermittantly generating pulses of a specific length;

serial transfer means connected to said shift register and said synchronization means for transferring said plurality of digital information out of said shift register at a point in time between two of said pulses of specific length;

conductor means connected to said serial transfer means leading to an outboard station;

synchronization-pulse detector means connected to said conductor means at said outboard station for detecting only said pulses of specific length;

a second shift register connected to said conductor means at said outboard station for serially accepting said digital information;

synchronization-pulse delaying means connected to said conductor for delaying all of said pulses of specific length, to effect a delayed synchronization pulse;

driving means connected to said second shift register and to said delaying means for driving said shift register;

said driving means being triggered by said delayed pulse to cause said digital information to move through said second shift register after said digital information has begun to be received;

parallel unloading means connected to said second shift register for simultaneously exiting said plurality of digital information;

checking means connected to said second shift register at said outboard station for providing a signal to require retransmission if the information transferred to said second shift register does not agree in parity with the serial information transferred out of said first shift register.

8. The digital information transmission system as claimed in claim 7 wherein said first shift register is an $n$-bit shift register and said second shift register is an $n+1$-bit shift register.

9. the digital information transmission system as claimed in claim 7 wherein said conductor means is composed of a single conductor and its respective ground return conductor.

10. The digital information system as claimed in claim 8 further comprising:

latching means connected to said $n+1$-bit shift register for inhibiting operation of said parallel unloading means during the transfer of said serial information.

* * * * *